(12) United States Patent
Lee

(10) Patent No.: US 8,878,704 B2
(45) Date of Patent: Nov. 4, 2014

(54) CHARACTER AND FUNCTION KEY INPUT DEVICE USING DICTIONARY ORDER AND USE FREQUENCY

(75) Inventor: Jin Woo Lee, Seoul (KR)

(73) Assignee: Jin Woo Lee, Seoul (KR)

( * ) Notice: Subject to any disclaimer, the term of this patent is extended or adjusted under 35 U.S.C. 154(b) by 544 days.

(21) Appl. No.: 13/147,503

(22) PCT Filed: Feb. 1, 2010

(86) PCT No.: PCT/KR2010/000598
§ 371 (c)(1),
(2), (4) Date: Aug. 2, 2011

(87) PCT Pub. No.: WO2010/090421
PCT Pub. Date: Aug. 12, 2010

(65) Prior Publication Data
US 2012/0086584 A1    Apr. 12, 2012

(30) Foreign Application Priority Data
Feb. 3, 2009    (KR) .................. 10-2009-0008412

(51) Int. Cl.
*B41J 3/01*    (2006.01)
*G06F 3/023*    (2006.01)
*G06F 3/01*    (2006.01)
*B41J 5/28*    (2006.01)

(52) U.S. Cl.
CPC .......... *G06F 3/0237* (2013.01); *H04M 2250/58* (2013.01); *H04M 2250/70* (2013.01); *B41J 5/28* (2013.01); *B41J 3/01* (2013.01); *G06F 3/018* (2013.01)
USPC ............... 341/23; 341/22; 345/171; 345/173; 400/110; 400/484; 400/485

(58) Field of Classification Search
CPC ............................. B41J 3/01; H04M 2250/70
USPC ................................ 341/22, 23; 345/171, 173
See application file for complete search history.

(56) References Cited

U.S. PATENT DOCUMENTS 5,812,117 A * 9/1998 Moon .......................... 345/169
6,356,258 B1 * 3/2002 Kato et al. ................... 345/168
(Continued)

FOREIGN PATENT DOCUMENTS

KR    1020020011299    2/2002
KR    1020020035698    5/2002
(Continued)

*Primary Examiner* — Daniel Wu
*Assistant Examiner* — Benyam Haile
(74) *Attorney, Agent, or Firm* — Bacon & Thomas, PLLC

(57) ABSTRACT

A character and function key input device comprises: a character button unit having character buttons, each of which is assigned to one or more characters of one or more languages or function key elements; a forward button which converts the character or function key element selected from among the characters or the function key elements into characters or function key elements assigned to the selected button or adjacent button in accordance with the dictionary order; and a backward button which converts the character or function key element selected from among the characters or the function key elements into characters or function key elements assigned to the selected button or adjacent button in accordance with the dictionary order, wherein said one or more characters or function key elements assigned to the character buttons are disposed adjacently to one other in the dictionary order, and the character or the function key element having the highest use frequency is used as a basic value. The dictionary order has a circulation configuration such that the first character or the first function key element appears again after the last character or the last function key element.

18 Claims, 10 Drawing Sheets

(56) References Cited

U.S. PATENT DOCUMENTS

| | | | |
|---|---|---|---|
| 7,671,765 B2 * | 3/2010 | Fux | 341/28 |
| 8,300,016 B2 * | 10/2012 | Lu et al. | 345/168 |
| 2011/0074715 A1 * | 3/2011 | Na | 345/173 |

FOREIGN PATENT DOCUMENTS

| | | |
|---|---|---|
| KR | 1020040032228 | 4/2004 |
| KR | 1020050043480 | 5/2005 |
| KR | 100687234 | 2/2007 |

* cited by examiner

CHARACTER AND FUNCTION KEY INPUT DEVICE USING DICTIONARY ORDER AND USE FREQUENCY

TECHNICAL FIELD

The present invention relates to a key input device for characters and functions using a dictionary order and frequency of use. More particularly, the present invention relates to a character and function key input device for use in a mobile phone or the like, which is capable of being easily used by a beginner while reducing the number of button selection in consideration of a dictionary order and frequency of use.

BACKGROUND OF THE INVENTION

The majority of portable information devices such as a cellular phone, a personal digital assistance (PDA), a global positioning system (GPS) and the like include a small-sized keypad. A usable range of such a small-sized keypad has been gradually increased to memos, twitter, various data processing using a portable information device and the like as well as general short message service (SMS) input. In an IP TV or the like, the small-sized keypad is also drawing attention for its necessity as a simple message input device.

Currently, a Korean alphabet (Hangul) input via a small-sized keypad is performed using schemes in which characters on character keys and/or elements on function keys are combined to newly produce characters that are not defined on the keypad. Among them, so-called the Chun-Jee-In (Korean) scheme and the Easy Hangul (Korean) scheme have been widely used. The Chun-Jee-In scheme requires that a user be familiar with positions of consonants and exhibits several problem as follows: In case that a final consonant of a previous letter and an initial consonant of a subsequent letter are the same character or in case that a previous character and a subsequent character are allocated to the same key, a continuous input thereof cannot be performed, and upon any deletion, the entire letter should be deleted. Meanwhile, in the Easy Hangul scheme, since there are large number of consonants which are not exhibited on the keypad, naive users cannot know intuitively for the use and a fingering distance is relatively long due to the frequent use of "*" and '#' buttons.

On the other hand, in an English input using a small-sized keypad, characters are arranged according to a simple dictionary order regardless of frequencies of use, so there is inconvenience that a button should be pressed several times in order to input even a character having a high use frequency. Furthermore, regardless of a user's skill, a next character can be inputted only when a cursor is moved to a next character line after flickering three times. In this case, when timing is not matched, there may occur an error that a different character is inputted in the present character line.

The following Table 1 shows frequencies of use for alphabetic characters used in entries of Concise Oxford Dictionary (11th edition revised, 2004). As known from Table 1, statistically, the frequency of use of five characters, i.e., E(11.16%), A(8.50%), R(7.58%), I(7.54%) and O(7.16%) reaches approximately 41.95%. Accordingly, it can be seen that large deviations exist in the use frequencies of English alphabets.

TABLE 1

| | | | | | |
|---|---|---|---|---|---|
| E | 11.1607% | 56.88 | M | 3.0129% | 15.36 |
| A | 8.4966% | 43.31 | H | 3.0034% | 15.31 |
| R | 7.5809% | 38.64 | G | 2.4705% | 12.59 |
| I | 7.5448% | 38.45 | B | 2.0720% | 10.56 |
| O | 7.1635% | 36.51 | F | 1.8121% | 9.24 |
| T | 6.9509% | 35.43 | Y | 1.7779% | 9.06 |
| N | 6.6544% | 33.92 | W | 1.2899% | 6.57 |
| S | 5.7351% | 29.23 | K | 1.1016% | 5.61 |
| L | 5.4893% | 27.98 | V | 1.0074% | 5.13 |
| C | 4.5388% | 23.13 | X | 0.2902% | 1.48 |
| U | 3.6308% | 18.51 | Z | 0.2722% | 1.39 |
| D | 3.3844% | 17.25 | J | 0.1965% | 1.00 |
| P | 3.1671% | 16.14 | Q | 0.1962% | (1) |

The Table 2 is derived by statistically analyzing characters of about 150 thousands acquired by extracting 2700 words from three different sources in the writing of Robert Edward Lewand, "Cryptographical Mathematics". Table 2 shows frequencies of use for characters in a general English plain text. In this analysis, it can be seen that characters such as E, T, A, O, I, N, S, H, R, and the like are frequently used as compared to other alphabet characters. There is a minor difference in analysis results of Table 1 and Table 2, but some levels of similarity exist in overall distribution of the use frequencies between the two results.

TABLE 2

| Character | Frequency | Character | Frequency |
|---|---|---|---|
| A | 8.17% | n | 6.75% |
| B | 1.49% | o | 7.51% |
| C | 2.78% | p | 1.93% |
| D | 4.25% | q | 0.10% |
| E | 12.70% | r | 5.99% |
| F | 2.23% | s | 6.33% |
| G | 2.02% | t | 9.06% |
| H | 6.09% | u | 2.76% |
| I | 6.97% | v | 0.98% |
| J | 0.15% | w | 2.36% |
| K | 0.77% | x | 0.15% |
| L | 4.03% | y | 1.97% |
| M | 2.41% | z | 0.07% |

As such, despite the deviation in the use frequencies of characters, in a current input scheme using a small-sized keyboard, including a Roman alphabet input scheme such as English or the like and a Chinese Pinyin input scheme, the same button has to be pressed three times at the time of inputting alphabets I, O, and R having high use frequency.

Also in Japanese characters, there are characters which can be inputted by pressing the same button five times since five characters are disposed on one button.

As described above, the small-sized keypad has a problem that the number of pressing operations for inputting a character is increased when the character is disposed at the back on a button.

In addition, the existing small-sized keypad has only character buttons, so that short message service (SMS) input can be performed easily, but does not have various function keys, which causes difficulties in processing various data, including use of Internet or the like. Thus, a smart phone or the like uses a Qwerty keyboard including function keys, but an input is not easy due to its small size, which becomes an obstacle in miniaturization and slimness.

Therefore, there have been a demand for a small-sized keypad or a character and function key input device capable of compensating for defects in a scheme of inputting Korean, Roman character such as English, and Japanese.

DISCLOSURE

Technical Problem

It is, therefore, an object of the present invention to provide a character and function key input device having function keys on a keyboard and a character array which allows a naive user to easily input characters with the relatively reduced number of button selection.

Technical Solution

In order to achieve the object, in accordance with the present invention, there is provided a character and function key input device, including: a character button unit including character buttons, each character button having one or more character or function key elements of one or more languages arranged thereon; a forward button for converting a character or function key element selected from the character or function key elements into a character or function key element arranged on a selected button or a button adjacent thereto based on a dictionary order; and a backward button for converting a character or function key element selected from the character or function key elements into a character or function key element arranged on a selected button or a button adjacent thereto based on the dictionary order, wherein the one or more character or function key elements arranged on the character button are adjacent to each other in the dictionary order, and a character or function key element having the highest use frequency is set as a basic value, and the dictionary order indicates a circular scheme in which a first character element or a first function key element is again exhibited subsequent to a last character element or a last function key element.

Advantageous Effects

In accordance with the present invention, an array on the keypad is provided using a dictionary order in a character and function key input device, whereby naive users may readily input characters.

In addition, an array on the keypad is provided based on the frequency of use for characters or elements configuring function keys in the character and function key input device, thereby reducing the number of button selections. According to various methods based on skill, the number of button selections may be greatly reduced without a delay in the input between characters.

Further, the shift between characters is possible using a forward button and a backward button, and a character may be selected in a reverse direction from a character or function key on an adjacent character button, such that the number of button selections can be reduced when selecting a character or a function key disposed on the rear of a character string.

Moreover, a phone function may be improved by adding the function keys to a smart phone, and an international standard in the character input scheme may be acquired since the present invention employs an input scheme using the dictionary order which is a standard for the worldwide characters.

BEST MODE FOR THE INVENTION

Hereinafter, embodiments of the present invention will be described in detail with reference to the accompanying drawings.

In the present invention, a scheme of using complete characters may be used as a scheme of inputting Korean alphabets, instead of a scheme in which characters or codes are combined. In a scheme of inputting an English alphabet, characters having relatively high use frequency may be designated as basic values of buttons, such that a corresponding character can be inputted with one button selection. In a Japanese alphabet input scheme, the input may be performed not only in an existing sequence of column but also in the sequence of a row.

In addition, a desired character may be selected by pressing a + button or a − button after pressing a basic value-marked button or a & button. Thereafter, a key for a next desired character needs to be pressed to complete the input of the desired character. Therefore, it is not required for a user to wait while a cursor is flickering.

Meanwhile, characters are inputted according to a dictionary order by using the − button, the & button and the + button, and thus beginners can be easily adapted thereto. A practiced hand may use not just one method but various modified methods and thereby it is possible to rapidly input characters through a simpler method. Upon occurrence of an erroneous input, it can be corrected using the + button or the − button with no deletion.

Figure 1:
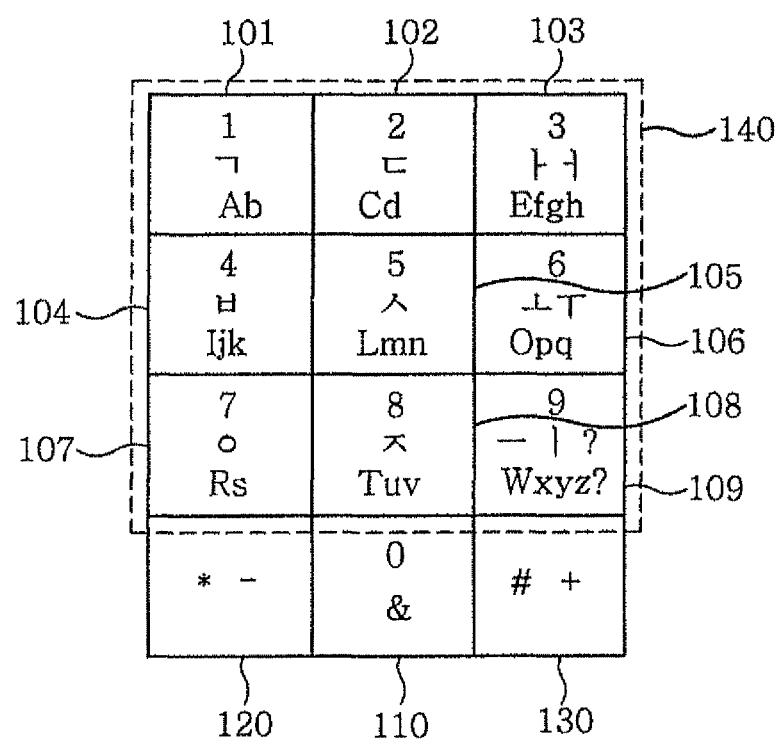
FIG. 1 shows an embodiment of a character input device of the present invention.

FIG. 1 illustrates an embodiment of a character input device of the present invention.

In the present embodiment, a character button unit 140 includes nine buttons exhibiting numerals, Korean alphabets and English alphabets. A first character button 101 represents a numeral '1', a Korean alphabet 'ㄱ' and English alphabets 'A, b'. A second character button 102 represents a numeral '2', a Korean alphabet 'ㄷ' and English alphabets 'C, d'. A third character button 103 represents a numeral '3', Korean alphabets 'ㅏ, ㅓ' and English alphabets 'E, f, g, h'. A fourth character button 104 represents a numeral '4', a Korean alphabet 'ㅂ' and English alphabets 'I, j, k'. A fifth character button 105 represents a numeral '5', a Korean alphabet 'ㅅ' and English alphabets 'L, m, n'. A sixth character button 106 represents a numeral '6', Korean alphabets 'ㅗ, ㅜ' and English alphabets 'O, p, q'. A seventh character button 107 represents a numeral '7', a Korean alphabet 'ㅇ', and English alphabets 'R, s'. An eighth character button 108 represents a numeral '8', a Korean alphabet 'ㅈ' and English alphabets 'T, u, v'. A ninth character button 109 represents a numeral '9', Korean alphabets 'ㅡ, ㅣ, ?' and English alphabets 'W, x, y, z, ?'. A special button 110 represents a numeral '0' and a special character '&'. A backward button 120 represents special characters '*, −'. A forward button 130 represents special characters '#, +'.

On this wise, in an English alphabet array, characters having relatively high frequency of use, for example, A, E, I, O, R and the like, are designated as basic values of respective buttons, so that a corresponding character can be inputted with one button selection in an English input mode, thereby significantly reducing the number of button selections for English alphabet input. The basic value of each button may be written in a capital letter on a button for visual convenience, but when the button is selected, the selected character is first inputted in a small letter.

In FIG. 1, only some basic alphabets of the Korean alphabets are shown, but all the Korean alphabets may be exhibited such that beginners more easily recognize an array of Korean alphabets.

Figure 2:
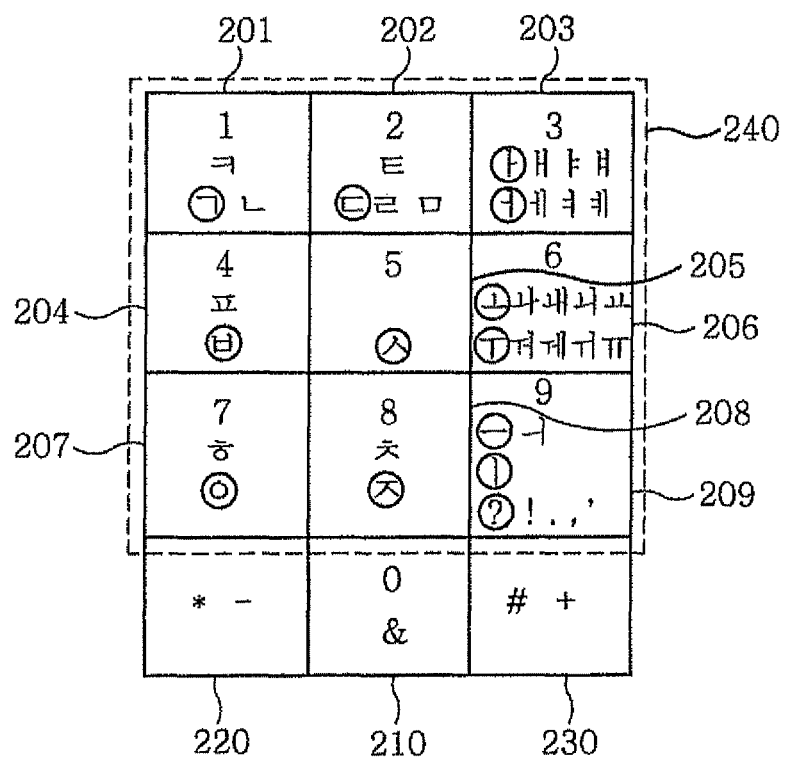
FIG. 2 illustrates an embodiment of Korean alphabet array on a character input device of the present invention.
Figure 3:
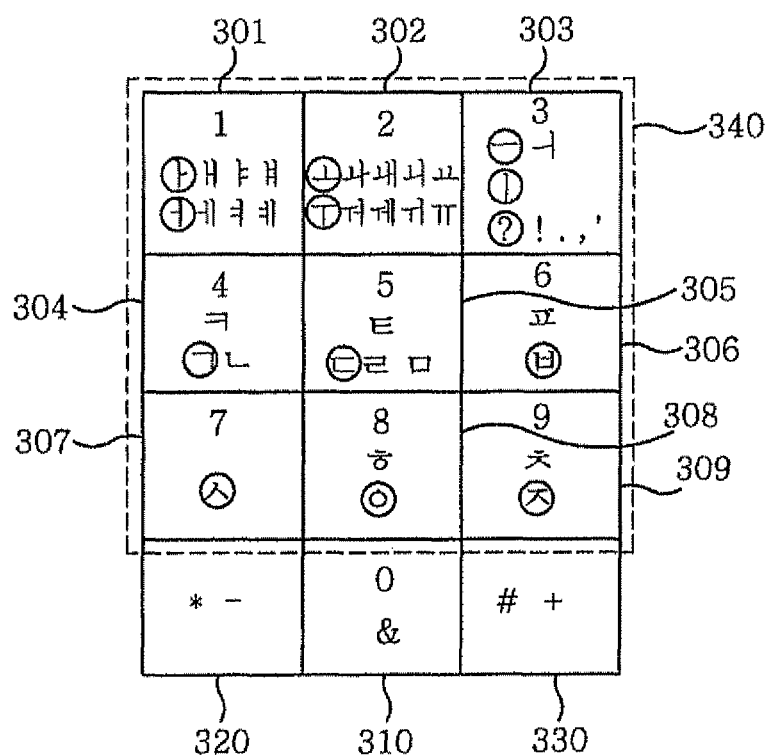
FIG. 3 provides another embodiment of Korean alphabet array on a character input device of the present invention.

FIGS. 2 and 3 illustrate examples in which all the Korean alphabets are arranged on the character input device.

Referring to FIG. 2, the character button unit 240 includes nine buttons on which numerals and Korean alphabets are shown. A first character button 201 represents a numeral '1' and Korean alphabets 'ㅋ, ㄱ, ㄴ'. A second character button 202 represents a numeral '2' and Korean alphabets 'ㅌ, ㄷ, ㄹ, ㅁ'. A third character button 203 shows a numeral '3' and Korean alphabets 'ㅏ, ㅐ, ㅑ, ㅒ, ㅓ, ㅔ, ㅕ, ㅖ'. A fourth character button 204 represents a numeral '4' and Korean alphabets 'ㅍ, ㅂ'. A fifth character button 205 represents a numeral '5' and a Korean alphabet 'ㅅ'. A sixth character button 206 represents a numeral '6' and Korean alphabets 'ㅗ, ㅘ, ㅙ, ㅚ, ㅛ, ㅜ, ㅝ, ㅞ ㅟ, ㅠ'. A seventh character button 207 represents a numeral '7' and Korean alphabets 'ㅎ, ㅇ'. An eighth character button 208 represents a numeral 'ㅊ, ㅈ' and Korean alphabets A ninth character button 209 represents a numeral '9', Korean alphabets 'ㅡ, ㅢ, ㅣ', '?' (question mark), '!' (exclamation mark), '.' (period), ',' (comma) and ''' (apostrophe). A special button 210 represents a numeral '0' and a special character '&'. A backward button 220 represents special characters '*, −'. A forward button 230 represents special characters '#, +'.

Referring to FIG. 3, a character button unit 340 includes nine buttons on which numerals and Korean alphabets are provided. A first character button 301 represents a numeral '1' and Korean alphabets 'ㅏ, ㅐ, ㅑ, ㅒ, ㅓ, ㅔ, ㅕ, ㅖ'. A second character button 302 represents a numeral '2' and Korean alphabets 'ㅗ, ㅘ, ㅙ, ㅚ, ㅛ, ㅜ, ㅝ, ㅞ, ㅟ, ㅠ'. A third character button 303 represents a numeral '3' and Korean alphabets 'ㅡ, ㅢ, ㅣ', '?' (question mark), '!' (exclamation mark), '.' (period), ',' (comma) and ''' (apostrophe). A fourth character button 304 represents a numeral '4' and Korean alphabets 'ㅋ, ㄱ, ㄴ'. A fifth character button 305 represents a numeral '5' and Korean alphabets 'ㅌ, ㄷ, ㄹ, ㅁ'. A sixth character button 306 represents a numeral '6' and Korean alphabets 'ㅍ, ㅂ'. A seventh character button 307 represents a numeral '7' and a Korean alphabet 'ㅅ'. An eighth character button 308 represents a numeral '8' and Korean alphabets 'ㅎ, ㅇ'. A ninth character button 309 represents a numeral '9' and Korean alphabets 'ㅊ, ㅈ'. A special button 310 represents a numeral '0' and a special character '&'. A backward button 320 represents special characters '*, −'. A forward button 330 represents special characters '#, +'.

In accordance with the embodiments of FIGS. 2 and 3, it does not need to press a symbol conversion button in order to input a special charactersuch as the question mark (?) or a symbol. Each character button may have an input function of English alphabets shown in FIG. 1 as well as numerals and Korean alphabets. As shown in FIGS. 2 and 3, groups of Korean alphabets, each being assigned to one numeral button, may be arranged on other numeral buttons through a position change between groups.

Figure 4:
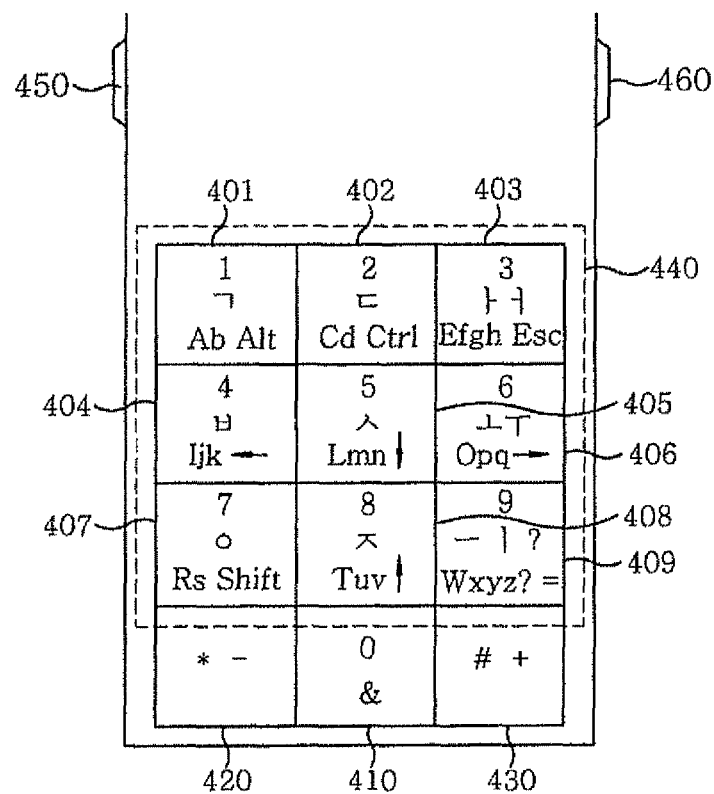
FIG. 4 illustrates an embodiment of a character and function key input device of the present invention, in which a function key, a delete button and a space button are added to the character input device.

FIG. 4 illustrates an embodiment of a character and function key input device of the present invention, in which a function key, a delete button and a space button are added to the character input device shown in FIG. 1.

A character button unit 440 includes nine buttons on which numerals, Korean alphabets, English alphabets, and function keys are presented. A first character button 401 represents a numeral '1', a Korean alphabet 'ㄱ', English alphabets 'A, b' and a function key 'Alt'. A second character button 402 represents a numeral '2', a Korean alphabet 'ㄷ', English alphabets 'C, d' and a function key 'Ctrl'. A third character button 403 represents a numeral '3', Korean alphabets 'ㅏ, ㅓ', English alphabets 'E, f, g, h' and a function key 'Esc'. A fourth character button 404 represents a numeral '4', a Korean alphabet 'ㅂ', English alphabets 'I, j, k' and a function key '←'. A fifth character button 405 represents a numeral '5', a Korean alphabet 'ㅅ', English alphabets 'L, m, n' and a function key '↓'. A sixth character button 406 represents a numeral '6', Korean alphabets 'ㅗ, ㅜ', English alphabets 'O, p, q' and a function key '→'. A seventh character button 407 represents a numeral '7', a Korean alphabet 'ㅇ'. English alphabets 'R, s' and a function key 'Shift'. An eighth character button 408 represents a numeral '8', a Korean alphabet 'ㅈ', English alphabets 'T, u, v' and a function key '↑'. A ninth character button 409 represents a numeral '9', Korean alphabets 'ㅡ, ㅣ', English alphabets 'W, x, y, z, ?', and a function key '='. A special button 410 represents a numeral '0' and a special character '&'. A backward button 420 represents special characters '*, −'. A forward button 430 represents special characters '#, +'.

Figure 7:
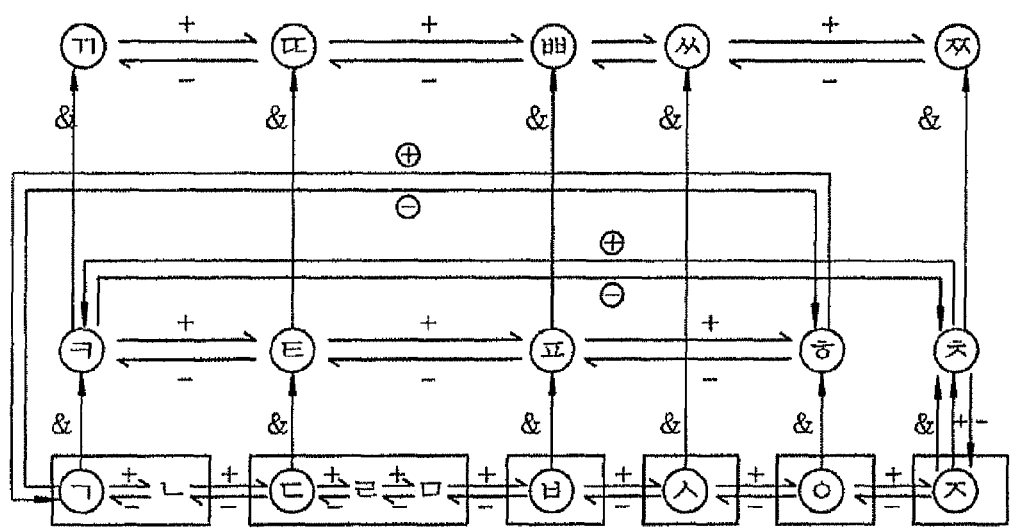
FIG. 7 depicts a Korean consonant circulation conversion process in a character and function key input device of the present invention.
Figure 8:
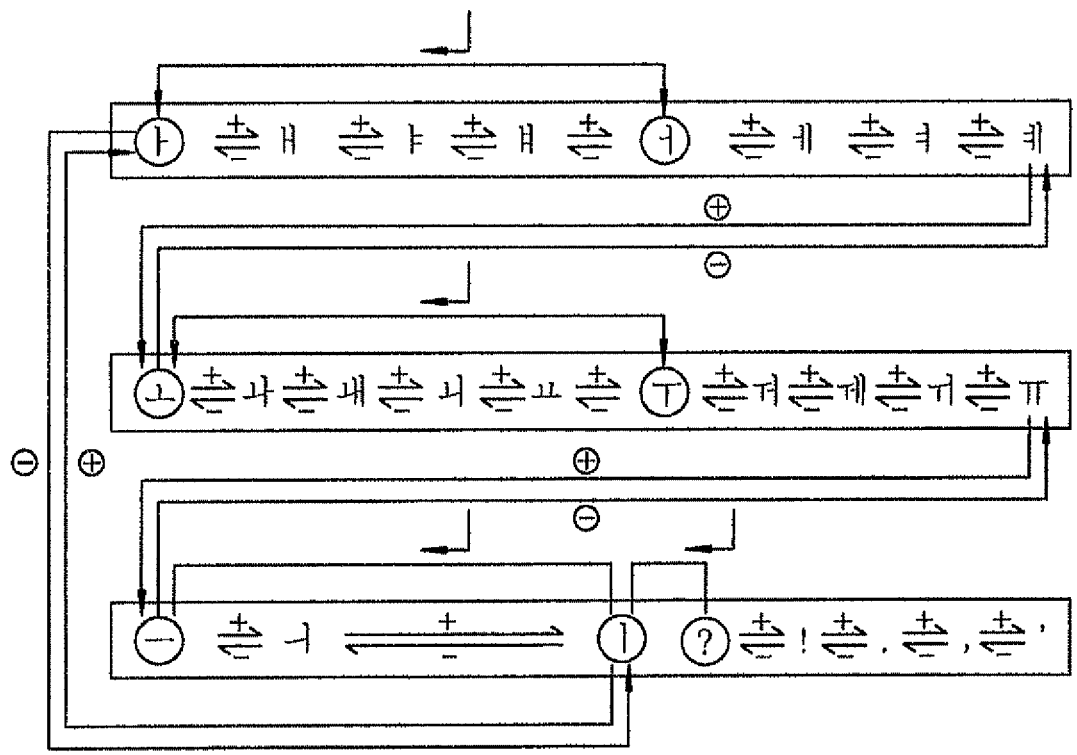
FIG. 8 illustrates a Korean vowel circulation conversion process in a character and function key input device of the present invention.

An input method of Korean character using the above-mentioned character and function key input device will be described with reference to FIGS. 7 and 8. FIGS. 7 and 8 illustrate a Korean consonant circulation conversion process and a Korean vowel circulation conversion process, respectively, in the character input device of the present invention.

When only some basic alphabets of the Korean alphabets are provided on buttons as shown in FIG. 4, other characters may be produced by using a − button as the backward button 420, a & button as the special button 410 and a + button as the forward button 430, based on a sequence in a Korean language dictionary.

In case of inputting a consonant character in a Korean input mode, as shown in FIG. 7, a 'ㄱ' button may be selected, and then, when the + button is pressed once, it changes to 'ㄴ'. Subsequently, it changes to 'ㄷ', and then to 'ㄹ', every time the + button is pressed. When the − button is pressed after the 'ㄱ' button is selected, it changes to 'ㅎ', which is the last character in the Korean consonants based on a circular dictionary order. It changes, in reverse order, to 'ㅍ' when the − button is pressed once more, and then to 'ㅌ' by an additional press of the − button.

On the other hand, in accordance with an embodiment of the present invention, the character and function key input device may be designed in a way such that when the & button is briefly pressed, a consonant is sequentially converted into an aspirated consonant and then into a tense consonant in a similar consonant group, and in case of vowel, a conversion into a similar diphthong is performed, and when the & button is pressed long, a previously inputted consonant or vowel is presented repeatedly. For example, when the & button is pressed after selecting the 'ㄱ' button, it is converted into 'ㅋ' belonging to a similar group to 'ㄱ', and when the & button is pressed once more, it is converted into 'ㄲ' belonging to the similar group to 'ㄱ' and 'ㅋ'. At this point, when the & button is pressed once more, 'ㅋ' may be again circularly converted into 'ㄱ'.

Meanwhile, since a separate circular dictionary order is presented among tense consonants such as ㄲ, ㄸ, ㅃ, ㅆ and ㅉ, when the + button is pressed in a 'ㄲ' state, 'ㄲ' is converted into 'ㄸ', and when the – button is pressed in the 'ㄲ' state, it is converted into 'ㅉ'.

Also in other Korean consonants, when the – button, the & button or the + button is pressed, a consonant conversion occurs along a corresponding arrow, as shown in FIG. 7. Here, 'ㅇ' and 'ㅎ' are bound as a similar group, but various pairs of Korean consonants such as ㅅ and ㅎ, ㅁ and ㅇ, and the like may be bound as a similar group in accordance with an embodiment. A criterion of classification into similar groups may be based on philological characteristics, but an optional criteria may be applied thereto.

Referring to FIG. 8, in case of vowel, after selecting a 'ㅏ' button, it changes to 'ㅐ', 'ㅑ', and then 'ㅒ' in sequence every time the + button is pressed. After selecting the 'ㅏ' button, it changes to 'ㅣ', which is the last character in the Korean vowels based on a circular dictionary order, and to 'ㅢ', and thereafter, to '–' in reverse order every time the – button is pressed.

In addition, when the 'ㅏ' button, is selected and the same button is pressed once more, it is converted into 'ㅓ' belonging to a similar group to 'ㅏ'. When an additional press is performed on the same button in the state of 'ㅓ', it may be circularly converted back into 'ㅏ'. A line-change symbol shown in FIG. 8 denotes that the same button is pressed once more.

When 'ㅏ', 'ㅓ', 'ㅗ', 'ㅜ', or '–' which is a basic value as a vowel on a keypad is inputted and the & button is then briefly pressed, 'ㅑ', 'ㅕ', 'ㅛ', 'ㅠ' or 'ㅢ' is inputted, respectively.

In accordance with an embodiment, at the time of a diphthong input, an input scheme using a dictionary array of circular conversion may be used mixed with a conventional conjoining input scheme. In use of the dictionary array of circular conversion, in order to input a diphthong 'ㅙ', a 'ㅗ' button may be pressed and the + button 130 has to be pressed twice, or a 'ㅜ' button may be pressed and the – button 120 has to be pressed three times. However, in a mixing input scheme in accordance with the present embodiment, the 'ㅗ' button is pressed and a 'ㅣ' button is pressed to produce 'ㅚ', and after that, the – button 120 is pressed only once to thereby produce 'ㅙ'. Here, when the + button 130 is pressed, it becomes 'ㅚ' according to the dictionary array of circular conversion. Since there exists only 'ㅢ' between '–' and 'ㅣ', the array sequence thereof may be changed for use convenience. Further, to input 'ㅠ', the '–' button and then the – button 120 is pressed in turn or the 'ㅜ' button is pressed and the & button is then briefly pressed.

In accordance with the present embodiment, a widely-used special symbol '?' may be provided at the end of the '–, ㅣ' on a button 109 so as to increase convenience.

Figure 9:
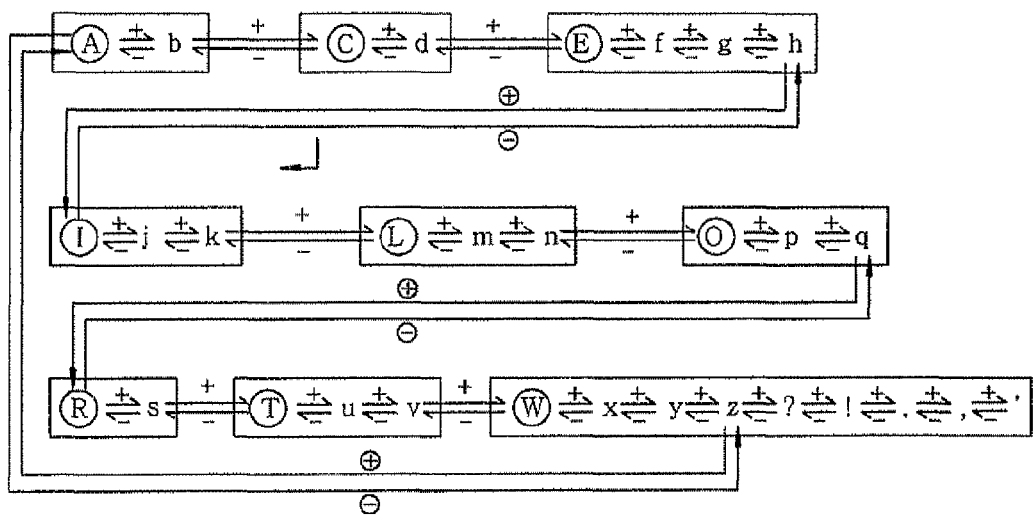
FIG. 9 shows an English circulation conversion process in a character and function key input device of the present invention.

In English character input method using the character and function key input device will be described with reference to FIG. 9. FIG. 9 illustrates an English character circular conversion process in the English input mode of the character and function key input device of FIG. 4.

English alphabets having relatively high use frequency may be designated as basic values of respective buttons. Here, when a button is pressed once, an alphabet as the basic value is inputted, and a subsequent or previous alphabet on the dictionary order can be selected by using the + button or the – button. The alphabets as the basic values may be exhibited in capital letters on the buttons for visual convenience, but the characters are first inputted in small letters when the buttons are selected.

Meanwhile, in the English input mode, a capital letter or a small letter is converted into each other when the & button is pressed briefly, and a previously inputted alphabet is repetitively outputted when the & button is pressed long.

In the English input mode, in order to input '?', W may be selected and then the + button is pressed to input '?' through 'x, y, z', or A may be selected and then the – button is selected to perform the input thereof. Considering that the number of button selections is smaller in the latter than the former, special symbols in an English keypad may be arranged in a different sequence from those in a Korean keypad when it is assumed that '?' among the special symbols is most frequently used.

For example, a button manipulation to input a sentence 'I like an apple?' will be described using the character and function key input device shown in FIG. 4. In the English input mode, first, (1) 'i' is inputted by pressing a numeral 4 button, (2) the character 'i' is converted into a capital letter 'I' by briefly pressing the & button, (3) a space button 460 is pressed, (4) a numeral 5 button is pressed to input 'l', (5) the numeral 4 button is pressed to input 'i', (6) the numeral 5 button is pressed to input 'l' and then (7) the – button 120 is pressed to convert 'l' into 'k', (8) a numeral 3 button is pressed to input 'e', and (9) the space button 460 is pressed. Subsequently, (10) a numeral 1 button is pressed to input 'a', (11) a numeral 6 button is pressed to input 'o' and (12) the – button is then pressed to convert 'o' into 'n', (13) the space button 460 is pressed, (14) the numeral 1 button is pressed to input 'a', (15) the numeral 6 button is pressed to input 'o' and (16) the + button is then pressed to convert 'o' into 'p', (17) the & button is long pressed to repetitively input the previous character 'p', (18) the numeral 5 button is pressed to input 'l', (19) the numeral 3 button is pressed to input 'e', and (20) the numeral 1 button is pressed to input 'a' and (21) the – button is then pressed to input '?'. To input the above sentence, the conventional Chun-Jee-In scheme requires 36 button selections and the conventional Easy Hangul (Korean) scheme requires 32 or more button selections, whereas the method of the present embodiment requires only 21 button selections as described above.

In another example, a button manipulation to input a word 'soccer' will be described using the character and function key input device in accordance with the present embodiment. (1) A numeral 7 button is selected to input 'r', (2) the + button is pressed to convert 'r' into 's', (3) the numeral button 6 is pressed to input 'o', (4) a numeral 2 button is pressed to input 'c', (5) a numeral 2 button is pressed or the & button is long pressed to input 'c', (6) a numeral 3 button is pressed to input 'e', and (7) the numeral 7 button is pressed to input 'r', thereby completing the word 'soccer' through the button inputs of only total 7 times. The Chun-Jee-In scheme requires 18 button selections and the Easy Hangul scheme requires 19 or more button selections, whereas the method of the present embodiment requires only 7 button selections.

Meanwhile, in English characters, when dictionary orderan alphabet character to be next inputted is close to a currently inputted alphabet character in viewpoint of a dictionary order, the & button is long pressed to again input the currently inputted alphabet, and then, the + button or the − button is pressed to perform a conversion thereof, thereby reducing the number of button selections. For example, to input 'yz', a W button is pressed and the + button is then pressed twice to produce 'y', and the & button is long pressed to again input 'y' and the + button is then pressed to convert the present 'y' into 'z', thereby completing 'yz'.

Regarding function keys in the character and function key input device, when each button is pressed long, it changes into a function mode so that a function key represented on each button, for example, Alt, Ctrl, Esc, Shift, arrows, an equal mark, or the like can be selected. In addition to the above-mentioned function keys represented on the buttons, various special characters and function keys may be included, which are not shown on the buttons but may be executed by selecting a specific English character in the function mode. For example, special characters such as '!, @, #, $, %, ˆ, *, (,)' provided on numeral buttons on the keyboard, including a bracket, are allocated to an alphabet 'b', a Delete key to an alphabet 'd', function keys F1 to F12 to an alphabet 'f', group (icon group, emoticon group) functions to an alphabet 'g', and a home (end, page up, page down) key is allocated to an alphabet 'h'. In this case, a first character '!' among the special characters allocated to the alphabet b can be inputted by pressing the numeral 1 button long and then the + button. In the state of '!' having been selected, if the + button is pressed twice continuously, a Delete function allocated to the alphabet d is executed. The Delete key may also be selected by once pressing the + button in a state that Ctrl key has been selected by long pressing the numeral 2 button. In this manner, the + button or the − button may be selected to execute the Function key, the group key or the home key allocated to the alphabets f, g or h, respectively. The home key allocated to the alphabet h can be selected by pressing the numeral 4 button long to select a left arrow function key and pressing the ? button. Meanwhile, in a state that '!' has been selected, if the − button is pressed long for a predetermined time, the special characters '!, @, #, $, %, ˆ, &, *, (,)', which are allocated to the alphabet b, are displayed in a longitudinal direction. In this state, a desired special character can be selected by briefly pressing the + button or the − button. When one character such as the alphabet f, g or the like includes several function keys, as described above, corresponding function keys are displayed longitudinally by pressing long the − button and thus a desired function key can be selected by briefly pressing the + button or the ? button.

For example, in order to select Ctrl+c, a C button is long pressed to select the Ctrl key, and then, the C button is again briefly pressed to select 'c', thereby producing Ctrl+c. Otherwise, in a state that the Ctrl key has been selected, if the − button is long pressed, function keys starting from Ctrl are arranged in a longitudinal direction. Here, Ctrl+c can also be selected by briefly pressing the + button or the − button to move a cursor in the longitudinal direction. In order to select Ctrl+z displayed in the rearmost in the alphabet sequence, the ? button is used to rapidly select Ctrl+z.

When the numeral 7 button is long pressed to select Shift, a current mode changes to a numeral input mode, and when the numeral 7 button is again long pressed, it returns to a character input mode. When the − button is long pressed in a state of Shift having been selected, a numeral, the Korean alphabet, the English small letter, the English capital letter and the Chinese character are displayed in a longitudinal direction, and they can be selected by briefly pressing the + button or the ? button to move a cursor in the longitudinal direction. If the − button is long pressed in a mode which is not a function mode, all of the character buttons are operated as function keys.

When the numeral 9 button is long pressed, the button is converted into a calculator mode. In the calculator mode, '?' is inputted when the ? button is briefly pressed, '/' is inputted when the − button is long, '+' is inputted when the + button is pressed in short, 'X' is inputted when the + button is long pressed, and '=' is inputted when the & button is pressed, thereby producing a calculation result.

In the character mode and function mode, an Enter function is performed when the + button is long pressed.

In a touch screen keypad, a C character may be touched and then dragged downwardly to select a displayed Ctrl+c key, thus allowing for a more convenient use.

The above-described function key input method may be applied to all kinds of character input devices using the input scheme based on the dictionary order with regard to Korean language, Japanese language and the like.

In addition, in accordance with the embodiment of the present invention, a delete button 450 is provided on an upper part of left side of the character and function key input device, and a space button 460 on an upper part of right side thereof. Such configuration in the character and function key input device allows not only thumbs but also index fingers to be used while inputting a message, thereby improving convenience and easiness of use. The delete button 450 and the space button 460 may be located on an upper part or other positions in a mobile phone so that they are selectable by other fingers.

Figure 5:
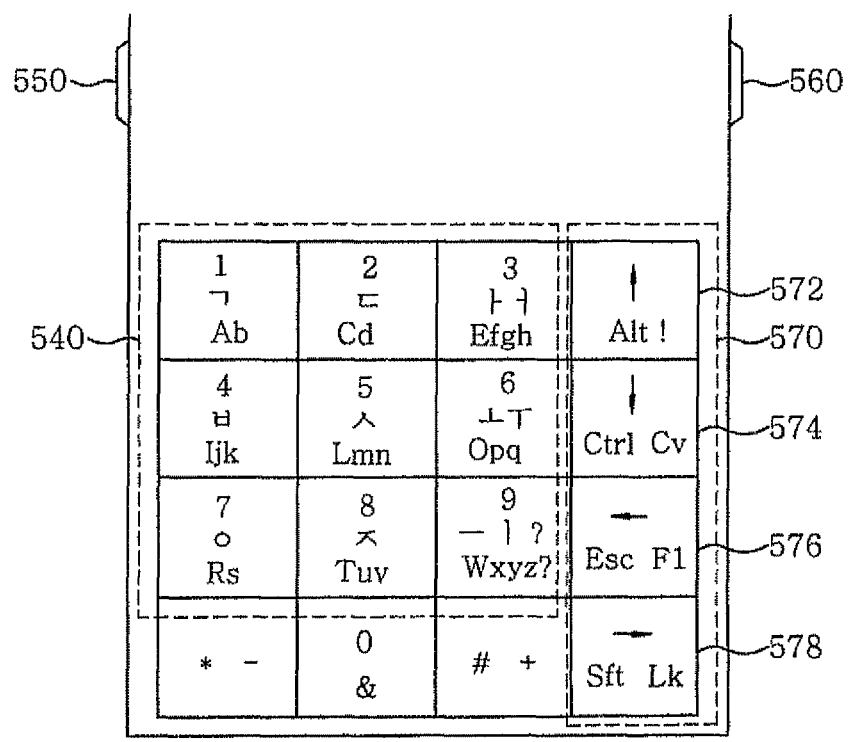
FIG. 5 presents another embodiment of a character and function key input device of the present invention.

FIG. 5 illustrates another embodiment of a character and function key input device of the present invention.

As shown in FIG. 5, a function button unit 570, a delete button 550 and a space button 560 have been added to the character input device of FIG. 1. On a first function button 572 of the function button unit 570, an upward arrow key '↑', 'Alt' and '!' are provided. 'Alt' is selected when the first function button 572 is briefly pressed. When the first function button 572 is long pressed, T is first selected and the special characters, '@, #, $, %, ˆ, &, *, (,)', which are shown on numeral buttons of the keyboard, can be selected. Further, the upward arrow key '↑' is selected when a fourth function button 578 is briefly pressed (Shift key is selected), and the corresponding function button 572 is then briefly pressed. A second function button 574 represents a downward arrow key '↓', 'Ctrl' and 'Cv' that denotes a Korean/English/Chinese conversion key. When the second function button 574 is briefly pressed, the Ctrl key is selected. When the second function button 574 is long pressed, 'Cv' as the Korean/English/Chinese conversion key is selected. The downward arrow key '↓' is selected when the fourth function button 578 is briefly pressed (the Shift key is selected) and the corresponding function button 574 is then briefly pressed. A left arrow key '←', 'Esc' and 'F1' are provided on a third function button 576. When the third function button 576 is briefly pressed, Esc is selected, and when the third function button 576 is long pressed, F1 to F12 can be selected from F1. When the corresponding function button 576 is briefly pressed after briefly pressing the fourth function button 578 (after selecting the Shift key), the left arrow key '←' is selected. On the fourth function button 578, a right arrow key '→', 'Sft' (Shift) and 'Lk' (Lock) are provided. When the fourth function button 578 is briefly pressed, the Shift key is selected, and when the fourth function button 578 is long pressed, the Lock key is selected. When the corresponding function button 578 is briefly pressed twice, the right arrow key '→' is selected.

Detailed functions of the respective function keys are selected using the + button or the – button.

Enter function is performed when the + button is long pressed. Special symbols (", `, ', ^, ~) such as an umlaut and an accent in German, French, Spanish, or the like, may be inputted by long pressing the – button.

The Shift key is applied to only a corresponding key when selecting a numeral on the character button and an upper function on the function buttons, and it can be, however, applied to all of character buttons and function keys on a corresponding position by pressing the Lock key after the selection of a character or function.

For example, in Korean alphabet input, the Shift key and the numeral 1 button are in turn pressed to input a numeral '1', and thereafter when the numeral 2 button is pressed, Korean alphabet 'ㄷ' is inputted. Whereas, if the Shift key is long pressed to perform a locking after the input of '1', pressing numeral 2 button is led to input a numeral '2'.

As described above, four function buttons may be added to substitute for function keys other than the character keys of the keyboard such that 4×4 buttons and touch screen substitute for keyboard functions.

In addition, the function key input device may include a delete button (backspace button) provided on a left side thereof and a space button provided on a right side thereof, so that index fingers can be used.

Moreover, the present invention may be applied to the languages using the Roman alphabet such as Spanish, French and German, and Chinese Pinyin, in addition to English, and may also be applied to a character input scheme based on a dictionary order and frequency of use with regard to all kinds of languages.

In the input of characters except English, special symbols (", `, ', ^, ~) such as an umlaut and an accent in German, French, Spanish, or the like may be inputted by long pressing the + button.

Figure 6:
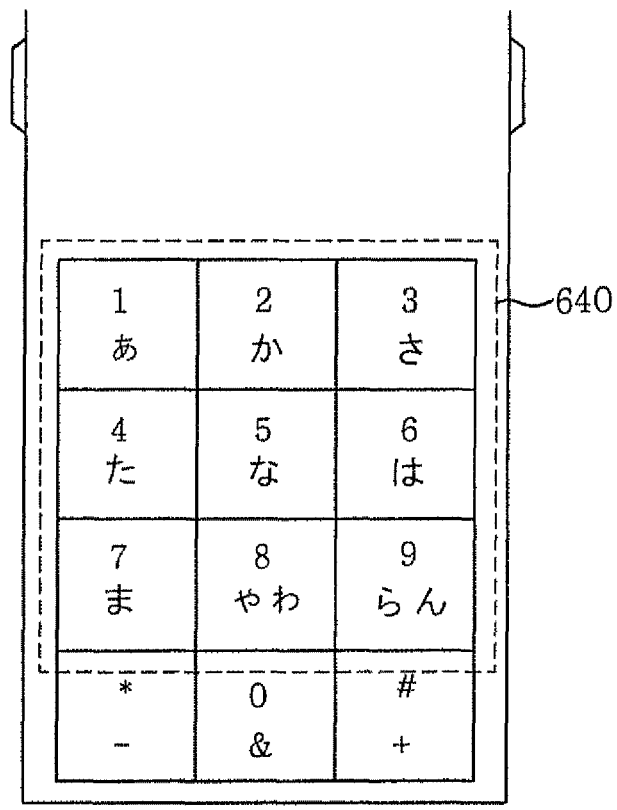
FIG. 6 illustrates an embodiment of Japanese character array on a touch screen in a character and function key input device of the present invention.

FIG. 6 illustrates an embodiment of Japanese character array on a touch screen in a character input device of the present invention. A character input device may include Japanese hiragana characters as elements configuring a character. A character button unit 640 includes a first character button having a basic value of あ; a second character button having a basic value of か; a third character button having a basic value of さ; a fourth character button having a basic value of た; a fifth character button having a basic value of な; a sixth character button having a basic value of は; a seventh character button having a basic value of ま; an eighth character button having a basic value of や or わ; and a ninth character button having a basic value of ら.

In each button, characters of column A (k (あ段) each having a clear sound are set as basic values, and when a corresponding button is pressed, a hiragana set as the basic value is inputted. When the + button is pressed, the input is performed in sequence of あ段, い段, う段, え段 and お段, and when the – button is pressed, the input is performed in a reverse sequence thereof. That is, characters are inputted in a column (段) direction. Pronunciation 'ん' is disposed on the last for convenience.

When a special key & button is briefly pressed after the input of a character, a sequential conversion into a sonant and a p-sound on the same column is performed, and when the & button is long pressed, a previously inputted character is repetitively inputted.

When a button is long pressed in a character selection, a subsequently selected character is a character from the same column (段). When a character to be inputted is displayed and a character button to be next inputted is then long pressed, the displayed character is inputted, and at the same time a character of the same column as the displayed character is displayed. After that, when a character button is pressed, a character of a selected column (段) may be inputted instead of a character of the column A (あ段) set as a basic value. If a character to be secondarily inputted is in the same column as a character to be first inputted, a button for the first character is long pressed when inputting the first character, and then, a second character is inputted, thereby significantly reducing the number of button selection.

For example, to input この, the numeral 3 button is pressed and the '–' button is pressed to thus input こ, and subsequently, the numeral 5 button is long pressed to thereby input の of the column O (お段), which is the same column as こ, instead of な of the column A (あ段) set as a basic value.

If the character button is again long pressed, it returns back to an original state that the character of the column A (あ段) having clear sound is set as a basic value.

To input characters having small forms in Japanese, the – button is long pressed after selecting a corresponding character. Then, it is converted into a character of a long consonant as a small letter of a corresponding character, つ(シ), あ(ア), い(イ), う(ウ), え(エ), お(オ), や(ヤ), ゆ(ユ), or よ(ヨ)/わ(ワ), and the converted character is inputted. In addition, when the + button is long pressed, a conversion into katakana is performed.

In a touch screen keypad, a character may be inputted in the same manner as the button keypad. Otherwise, characters included in a character pad may be displayed by touching a corresponding pad and dragging in a column (段) or row (行) direction, and a corresponding character may be then touched and inputted to thereby reduce the number of touch selections. For example, to input 'このおとこ', a conventional scheme requires 25 button selections. However, in the button selection scheme of the present invention, the numeral 3 button and the – button may be in turn pressed to input こ, and the numeral 6 button and the – button are in turn pressed to input の, and the numeral 2 button and the – button are in turn pressed to input お, and the numeral 5 button and the – button are in turn pressed to input と, and the numeral 3 button and the – button are in turn pressed to input こ. Thus, the input may be completed through button selections of total 10 times.

In another sequence, the numeral 3 button and the – button may be in turn pressed to display こ, and then, the numeral 5 button is long pressed to input こ, thereby showing の on a next character unit and inputting a character of a column O (お段) as a subsequent input character. お is inputted by pressing the numeral 1 button and と is inputted by pressing the numeral 4 button, and こ is inputted by pressing the numeral 2 button. Thus, the input may be completed through button selections of total 6 times.

In the touch screen, as shown in FIG. 6, a か character touch pad may be pressed, and a drag therefor may be performed in the column (段) direction to display characters before and after the か character. After that, こ is touched and dragged in a row (行) direction, and then a touch is performed in a sequence of の, お, と and こ to thereby complete the input through button selections of total 6 times.

Figure 10:
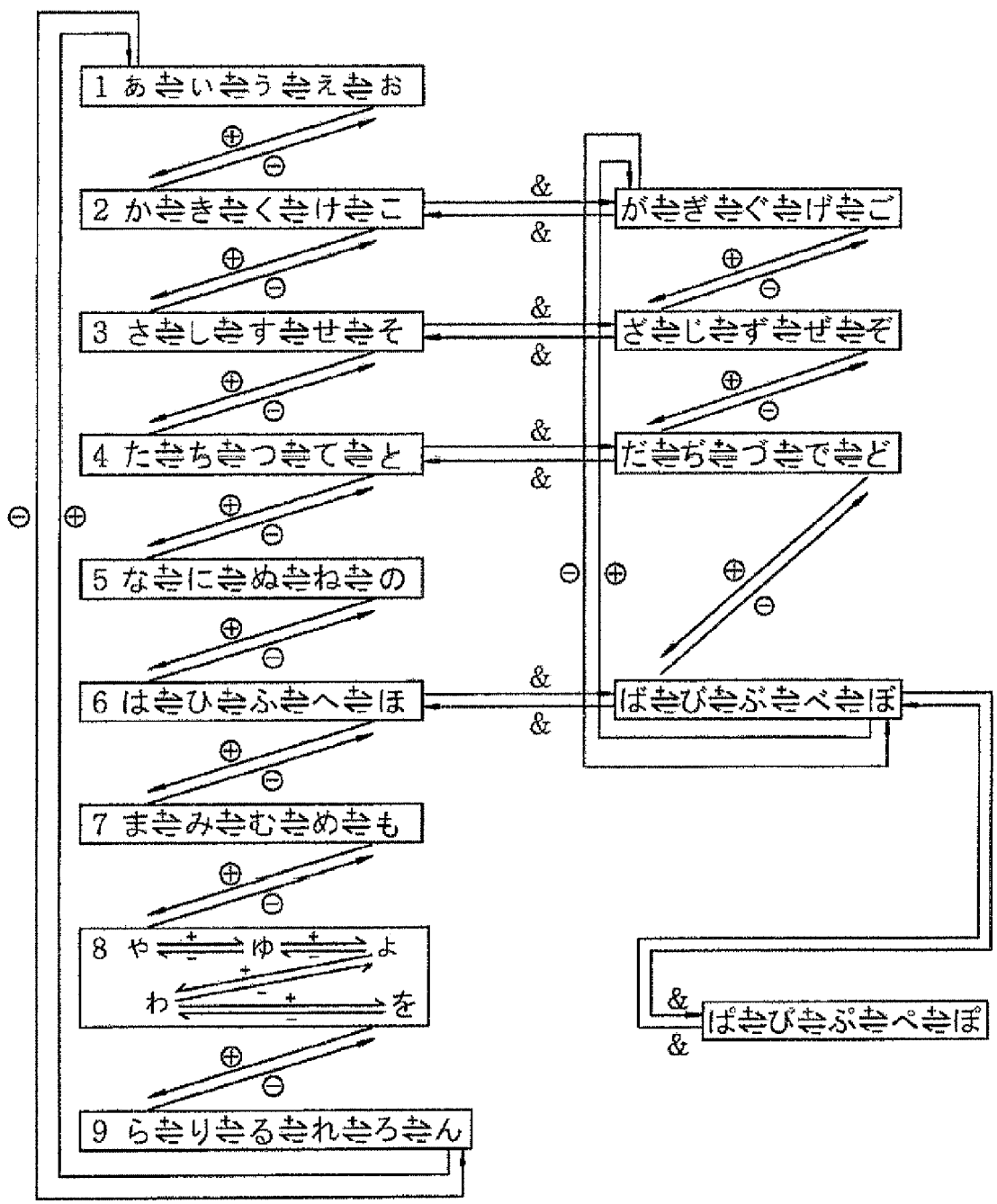
FIG. 10 presents a Japanese circulation conversion process in a character and function key input device of the present invention.

FIG. 10 illustrates a Japanese circulation conversion process in a character and special key input device of the present invention. On each button, a character of column A (あ段) having a clear sound is set as a basic value, and when a corresponding button is pressed, a hiragana as the basic value is inputted. When the + button is pressed, the input is performed in sequence of あ段, い段, う段, ..., え段, お段, and when the − button is pressed, the input is performed in a reverse sequence thereof. A first character あ and a last character ん are connected through the + button and the − button.

When the special button, &, is briefly pressed, a sequential conversion into a sonant and a p-sound of the same column is performed.

If the button is long pressed when selecting a character, characters of the selected column (段) are set as basic values. When the button is again long pressed, it returns to an original state that the characters of column A (あ段) having a clear sound are set as the basic value.

The modules, function blocks or units in accordance with the present embodiment may be implemented by various kinds of well-known devices, such as electronic circuits, integrated circuits, application specific integrated circuits (ASIC), and the like, in which they may be implemented in respective individuals, or as being integrated in one from two or more.

While the invention has been shown and described with respect to the embodiments, it will be understood by those skilled in the art that the invention is not limited to the above particular embodiments described in the specification and various changes and modification may be made without departing from the scope of the invention. Therefore, all changes and modification which belong to the genuine scope of the invention will be embraced by the following claims.

The invention claimed is:

1. A character and function key input device, comprising:
a character button unit including character buttons, each character button having one or more character or function key elements of one or more languages arranged thereon;
a forward button for converting a character or function key element selected from the character or function key elements into an adjacent element arranged on a selected button or a button adjacent thereto based on a dictionary order, irrespective of whether the adjacent element is a character or a function key element; and
a backward button for converting a character or function key element selected from the character or function key elements into an adjacent element arranged on a selected button or a button adjacent thereto based on a dictionary order, irrespective of whether the adjacent element is a character or a function key element,
wherein the one or more character or function key elements arranged on the character button are adjacent to each other in the dictionary order, and a character or function key element having the highest use frequency is set as a basic value,
wherein the dictionary order indicates a circular scheme that includes each of the character buttons on which said one or more character or function key elements are arranged and in which a first character element or a first function key element of the dictionary order is again exhibited subsequent to a last character element or a last function key element of the dictionary order,
wherein other character or function key elements other than the character or function key element which is set as the basic value are converted from the selected character or function key element into the adjacent element, and
wherein said other character elements or function key elements are converted irrespective of whether the adjacent element is arranged on the character button by pressing the forward button and backward button.

2. The character and function key input device of claim 1, wherein the character or function key element includes an alphabet, and
the character button unit allows each of A, E, I, O, R and T, having a relatively high use frequency among the alphabets, to be exhibited as the basic value on different character buttons.

3. The character and function key input device of claim 1, wherein the character button unit includes a first character button that exhibits A as the basic value; a second character button that exhibits one of C and D as the basic value; a third character button that exhibits E as the basic value; a fourth character button that exhibits I as the basic value; a fifth character button that exhibits one of L, M and N as the basic value; a sixth character button that exhibits O as the basic value; a seventh character button that exhibits R as the basic value; an eighth character button that exhibits T as the basic value; a ninth character button that exhibits one of W, X, Y and Z as the basic value.

4. The character and function key input device of claim 3, further comprising a special button for performing a conversion between a capital letter and a small letter when briefly pressed, and repetitively outputting a previously inputted alphabet when long pressed.

5. The character and function key input device of claim 1, wherein the character or function key element includes a Korean alphabet, and
the character button unit includes a first character button that exhibits ㄱ as the basic value; a second character button that exhibits ㄷ as the basic value; a third character button that exhibits ㅂ as the basic value; a fourth character button that exhibits ㅅ as the basic value; a fifth character button that exhibits ㅇ as the basic value; a sixth character button that exhibits ㅈ as the basic value; a seventh character button that exhibits one of ㅏ and ㅓ as the basic value; an eighth character button that exhibits one of ㅗ and ㅜ as the basic value; a ninth character button that exhibits one of − and ㅣ as the basic value.

6. The character and function key input device of claim 5, further comprising a special button for performing, when briefly pressed in a state that a consonant has been inputted, a conversion between character elements within a similar consonant group allocated to the same character button as that of the consonant, and performing, when briefly pressed in a state that one vowel of ㅏ, ㅓ, ㅗ, ㅜ and − has been inputted, a conversion into a diphthong similar to the vowel, 'ㅑ, ㅕ, ㅛ, ㅠ, ㅢ', respectively, and repetitively outputting, when long pressed, a previously inputted character or function key element.

7. The character and function key input device of claim 6, wherein the similar-consonant group includes at least one of a group including ㅣ, ㅓ and ㄲ; a group including ㄷ, ㅌ and ㄸ; a group including ㅂ, ㅍ and ㅃ; a group including ㅈ, ㅊ and ㅉ; a group including ㅅ and ㅆ; and a group including ㅇ and ㅎ.

8. The character and function key input device of claim 6, wherein an existing vowel conjoining input scheme is usable together when inputting the diphthong.

9. The character and function key input device of claim 5, wherein the forward button and the backward button perform a conversion in a sequence of 'ㅣ, ㄴ, ㄷ, ㄹ, ㅁ, ㅂ, ㅅ, ㅇ, ㅈ, ㅊ, ㅋ, ㅌ, ㅍ, ㅎ' and a sequence of 'ㄲ, ㄸ, ㅃ, ㅆ, ㅉ' as a separate dictionary order by moving forward and backward in the sequence, respectively.

10. The character and function key input device of claim 9, wherein the separate dictionary order further includes a sequence in which 'ㅏ, ㅓ, ㅗ, ㅜ, ㅡ, ㅣ' is set as a basic sequence, while 'ㅐ, ㅑ, ㅒ' are added between 'ㅏ' and 'ㅓ' in no particular order, 'ㅔ, ㅕ, ㅖ' are added between 'ㅓ' and 'ㅗ' in no particular order, 'ㅘ, ㅙ, ㅚ, ㅛ' are added between 'ㅗ' and 'ㅜ' in no particular order, 'ㅝ, ㅞ, ㅟ, ㅠ' are added between 'ㅜ' and 'ㅡ' in no particular order, and 'ㅢ' is added between 'ㅡ' and 'ㅣ'.

11. The character and function key input device of claim 1, wherein each of the character buttons includes at least one function key, and
when one of the character buttons is long pressed, a function key set as the basic value on a corresponding character button is selected, and when the backward button is long pressed after selecting the function key set as the basic value, function keys allocated to the character button are arranged in a longitudinal direction to thereby be able to select a desired function key therefrom by using the forward button and the backward button.

12. The character and function key input device of claim 1, wherein each of the character buttons includes at least one function key, and
wherein the device further includes a touch screen function in which a function key set as the basic value is selected when one of the character buttons is long touched, and function keys included in the touched character button are arranged when dragging downwardly after selecting the function key set as the basic value.

13. The character and function key input device of claim 1, wherein the character elements include Japanese hiragana characters, and
the character button unit includes a first character button that exhibits あ as the basic value; a second character button that exhibits か as the basic value; a third character button that exhibits さ as the basic value; a fourth character button that exhibits た as the basic value; a fifth character button that exhibits な as the basic value; a sixth character button that exhibits は as the basic value; a seventh character button that exhibits ま as the basic value; an eighth character button that exhibits や or わ as the basic value; and a ninth character button that exhibits ら as the basic value, and
when each of the character buttons is long pressed, a subsequently inputted character is a character from the same column as that of a selected character; and when the character button is again long pressed, a character state returns back to an original state which displays an original character set as the basic value, and the device further includes a special button, wherein when the special button is briefly pressed, a conversion into a sonant of the same column is performed; when the special button is briefly pressed once more, a conversion into a p-sound of the same column is performed; and when the special button is long pressed, the previously inputted character is repetitively inputted.

14. The character and function key input device of claim 13, wherein the forward button and the backward button respectively perform a conversion in a sequence of あ段、い段、う段、え段 and お段 by moving forward and backward in the sequence, respectively.

15. The character and function key input device of claim 13, further comprising a special button for performing, when long pressed, a conversion into characters of a long consonant as a small letter of a corresponding character, つ(シ), あ(ア), い(イ), う(ウ), え(エ), お(オ) / や(ヤ), ゆ(ユ), and よ(ヨ) / わ(ワ), and performing a conversion into a katakana.

16. The character and function key input device of claim 13, further comprising a touch screen function in which characters in a column direction or a row direction before and after a corresponding character are arranged when dragging in the column direction or the row direction after touch.

17. The character and function key input device of claim 1, wherein one of the character buttons further exhibits at least one of a question mark (?), an exclamation mark (!), a period (.), a comma (,) and an apostrophe (').

18. The character and function key input device of claim 1, further comprising at least one function button having one or more function key of a backspace button provided on a left side of the device, a space button provided on a right side thereof, and a 'Shift',
wherein when the function button is briefly pressed, a function key set as the basic value of a corresponding function button is selected; when the function button is long pressed, a second function key is selected; and when the function button is briefly pressed after briefly pressing a function button having the Shift, a third function key is selected.

* * * * *